US011895170B2

(12) United States Patent
Mena et al.

(10) Patent No.: US 11,895,170 B2
(45) Date of Patent: Feb. 6, 2024

(54) SYNCHRONICITY FOR VIRTUAL REALITY/AUGMENTED REALITY INTERACTIVE SESSIONS IN WIRELESS NETWORKS

(71) Applicant: Cisco Technology, Inc., San Jose, CA (US)

(72) Inventors: Sergio Mena, Saubraz (CH); Lorenzo Granai, Crissier (CH); Malcolm M. Smith, Richardson, TX (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 17/249,673

(22) Filed: Mar. 9, 2021

(65) Prior Publication Data

US 2022/0294840 A1   Sep. 15, 2022

(51) Int. Cl.
*H04L 65/65* (2022.01)
*H04L 65/80* (2022.01)
*G06T 19/00* (2011.01)
*H04L 67/131* (2022.01)
*H04L 67/62* (2022.01)
(Continued)

(52) U.S. Cl.
CPC .......... *H04L 65/65* (2022.05); *G06T 19/003* (2013.01); *H04L 65/1033* (2013.01); *H04L 65/403* (2013.01); *H04L 65/80* (2013.01); *H04L 67/131* (2022.05); *H04L 67/62* (2022.05)

(58) Field of Classification Search
CPC ..... G06T 19/003; H04L 65/65; H04L 65/403; H04L 65/80; H04L 65/1033; H04L 67/62
See application file for complete search history.

(56) References Cited

U.S. PATENT DOCUMENTS 9,699,437 B2    7/2017  Cole et al.
10,446,119 B1 * 10/2019  Lakshmikantha ... H04N 19/436
10,477,105 B2   11/2019  Ye et al.
(Continued)

FOREIGN PATENT DOCUMENTS

CN          114727262 A  *  7/2022
WO     WO-2022013438 A1  *  1/2022  .......... H04W 72/042

OTHER PUBLICATIONS

Shreyas Trivedi, "Wi-Fi 6 OFDMA: Resource unit (RU) allocations and mappings", Cisco Blogs / Networking / , May 15, 2020 (retrieved from https://blogs.cisco.com/networking/wi-fi-6-ofdma-resource-unit-ru-allocations-and-mappings) (Year: 2020).*

(Continued)

*Primary Examiner* — Emmanuel L Moise
*Assistant Examiner* — Robert A Shaw
(74) *Attorney, Agent, or Firm* — Patterson + Sheridan, LLP

(57) ABSTRACT

Embodiments for virtual reality (VR) and augmented reality (AR) scenes updates at VR/AR devices in a network are described. Network traffic for the scene updates is divided into traffic layers such as coarse grain (CG) layer traffic and a fine grain (FG) layer traffic for a give VR/AR scene update. The CG layer traffic is scheduled first in resource units (RUs) of a plurality a transmission opportunity (TXOP) for a VR device and FG layer traffic is scheduled in remaining RUs during the TXOP to provide synchronous viewing experiences to users of the VR/AR devices.

12 Claims, 10 Drawing Sheets

(51) Int. Cl.
  *H04L 65/403* (2022.01)
  *H04L 65/1033* (2022.01)

(56) References Cited

U.S. PATENT DOCUMENTS

| | | | |
|---|---|---|---|
| 10,643,296 B2 | 5/2020 | Nguyen et al. | |
| 2012/0075433 A1* | 3/2012 | Tatzgern | G06T 11/60 |
| | | | 348/E13.074 |
| 2013/0215115 A1* | 8/2013 | Jenkins | G06T 15/00 |
| | | | 345/419 |
| 2015/0249813 A1* | 9/2015 | Cole | G11B 27/30 |
| | | | 386/241 |
| 2017/0200252 A1* | 7/2017 | Nguyen | G09G 5/227 |
| 2018/0089903 A1* | 3/2018 | Pang | H04N 23/45 |
| 2018/0255555 A1* | 9/2018 | Rangaraj Manavalan | |
| | | | H04W 72/535 |
| 2018/0310333 A1* | 10/2018 | Akkarakaran | H04W 72/20 |
| 2018/0359189 A1* | 12/2018 | Ye | H04N 23/698 |
| 2019/0045534 A1* | 2/2019 | Zaks | H04W 56/001 |
| 2019/0141359 A1* | 5/2019 | Taquet | H04N 21/6373 |
| 2019/0230142 A1* | 7/2019 | He | H04N 21/816 |
| 2019/0327751 A1* | 10/2019 | Dong | H04L 5/0044 |
| 2020/0077124 A1* | 3/2020 | Shi | H04N 21/6587 |
| 2020/0133610 A1* | 4/2020 | Vlachou | G06T 15/04 |
| 2020/0137462 A1* | 4/2020 | He | H04N 21/472 |
| 2020/0137622 A1* | 4/2020 | Vlachou | G06F 3/011 |
| 2020/0267753 A1* | 8/2020 | Adjakple | H04W 72/1268 |
| 2020/0281008 A1* | 9/2020 | Aboul-Magd | H04W 72/569 |
| 2020/0302681 A1* | 9/2020 | Totty | G06T 7/74 |
| 2020/0389869 A1* | 12/2020 | Patil | H04W 12/069 |
| 2021/0019953 A1* | 1/2021 | Pekelny | G06T 7/32 |
| 2021/0035352 A1* | 2/2021 | Harviainen | G02B 27/0172 |
| 2021/0105451 A1* | 4/2021 | Oyman | H04N 19/597 |
| 2021/0135733 A1* | 5/2021 | Huang | G06N 3/084 |
| 2022/0007019 A1* | 1/2022 | He | H04N 19/174 |
| 2022/0053560 A1* | 2/2022 | Xin | H04W 28/0268 |
| 2022/0095355 A1* | 3/2022 | Kim | H04W 76/28 |

OTHER PUBLICATIONS

U.S. Appl. No. 16/655,083, Sergio Mena, Lorenzo Granai, Malcolm M. Smith, and Jerome Henry, "Increasing Synchronization of Virtual Reality Scene Elements With Software Defined Network (SDN) Originated Information," filed on Oct. 16, 2019.

* cited by examiner

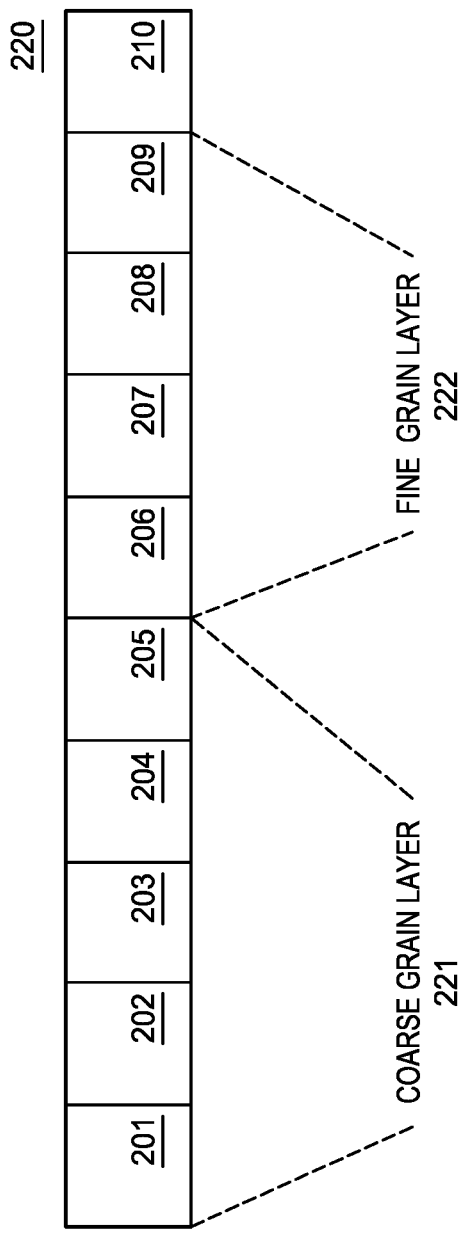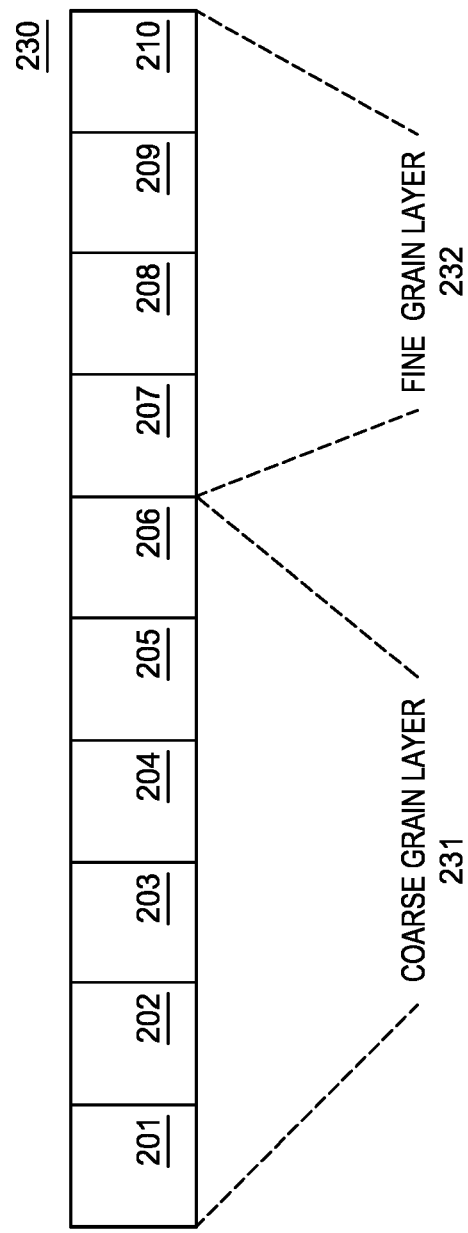

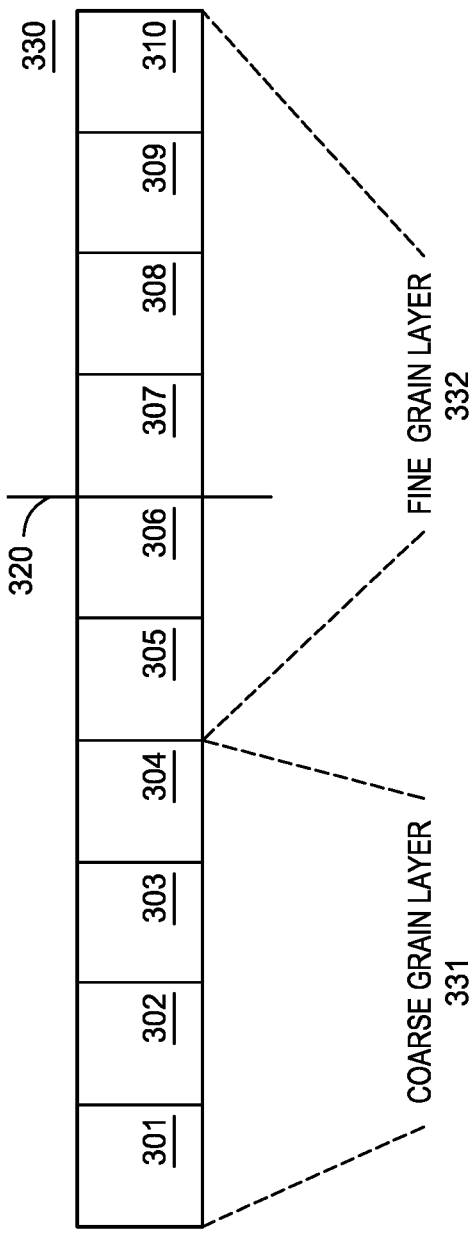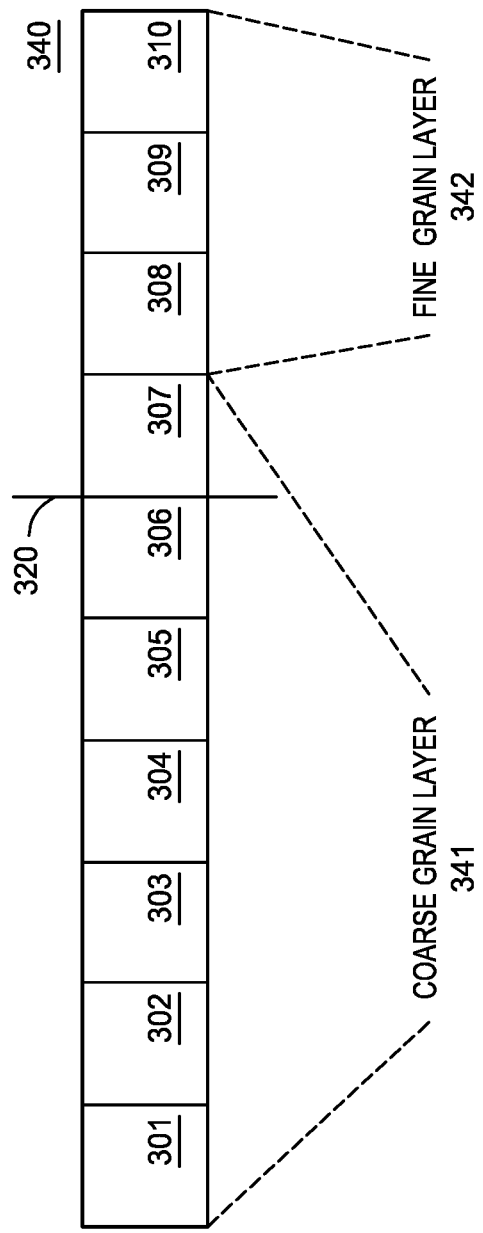
FIG. 3A
FIG. 3B

| CLIENT | SCENE | AP | CG RU% | FG RU% |
|--------|---------|-----|--------|--------|
| 130a | SCENE 1 | 120 | 40 | 6 |
| 130b | SCENE 2 | 120 | 20 | 7 |
| 130a | SCENE 2 | 120 | 20 | 7 |

FIG. 4

SYNCHRONICITY FOR VIRTUAL REALITY/AUGMENTED REALITY INTERACTIVE SESSIONS IN WIRELESS NETWORKS

TECHNICAL FIELD

Embodiments presented in this disclosure generally relate to providing synchronous viewing experiences for users viewing virtual reality and augmented reality scenes in a network. More specifically, embodiments disclosed herein are directed to providing interactive synchronicity among users utilizing virtual or augmented reality devices on wireless networks.

BACKGROUND

Utilization of Virtual Reality (VR) and Augmented Reality (AR) applications and devices have greatly expanded from novelty applications to widespread general use cases. In some examples, these VR/AR applications function on wireless devices (e.g., speciality VR/AR devices, smart phones, etc.). These wireless devices are connected to both a wider network (e.g., a wireless area network (WAN), the Internet, etc.) and to each other via wireless networks. In some examples, the VR/AR applications provide interactive multi-user experiences over the wireless networks. In these interactive multi-user VR/AR applications (e.g., conferencing, video games, etc.), users should see a consistent and synchronized VR/AR scene (e.g., a same set of visual objects in the same viewed environment).

To provide the synchronized VR/AR scenes, the VR/AR applications require synchronized updates to the multiple scene elements for the various users. Moreover, real-time updates to the scene elements, made by the users, then have stringent requirements in terms of latency, bandwidth, privacy/confidentiality, synchronization of updates to the scene elements, etc. Providing synchronized updates within bandwidth and other traffic handling requirements remains difficult.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 2A-2B illustrates transmission opportunities with a coarse grain layer and a fine grain layer, according to embodiments described herein.

FIGS. 3A-B illustrates transmission opportunities at an access point, according to embodiments described herein.

FIG. 4 illustrates a ranked list, according to embodiments described herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
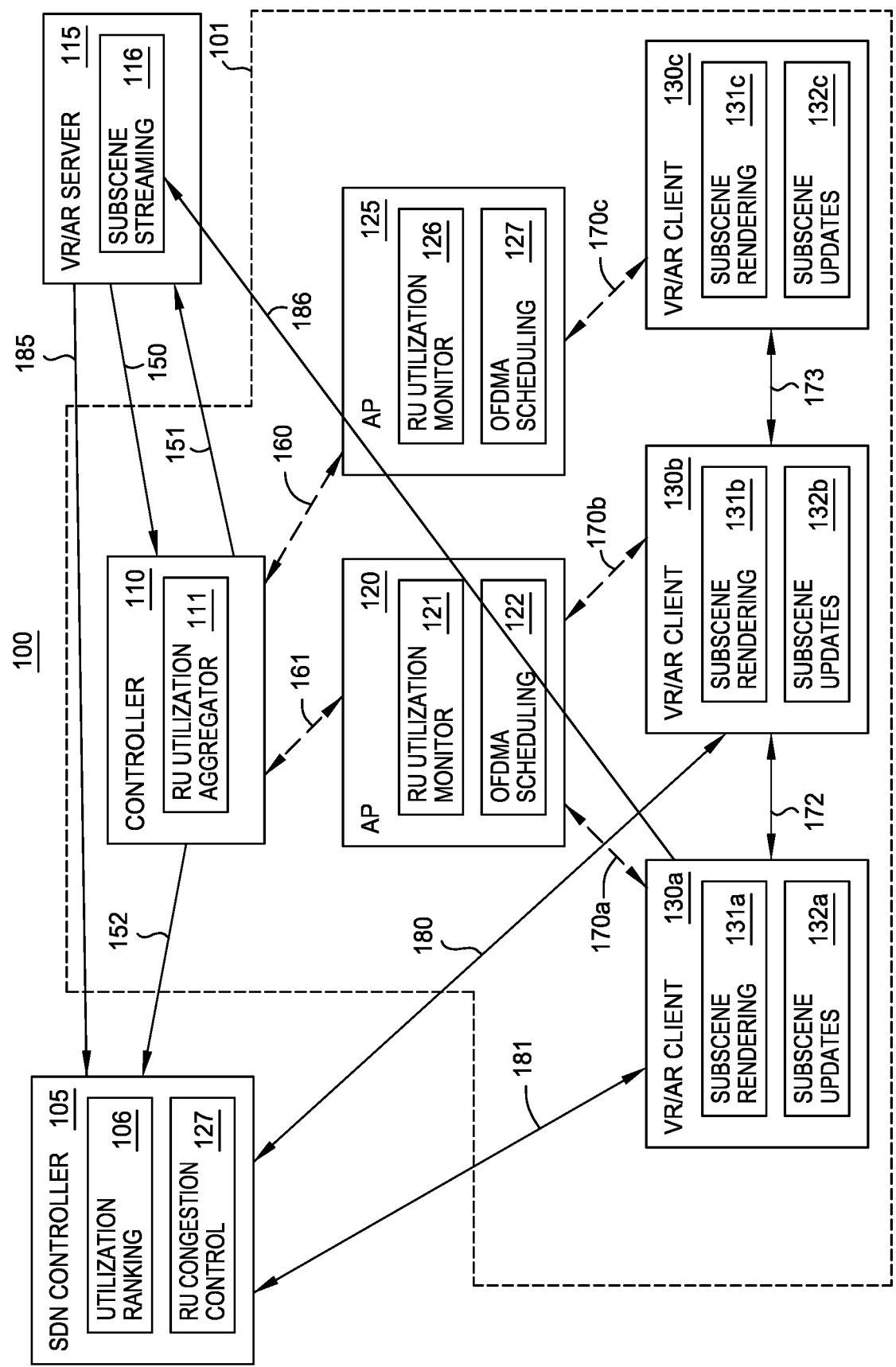
FIG. 1 illustrates a network environment for virtual reality and augmented reality scenes, according to embodiments described herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions of a method. The method includes determining, at a virtual reality (VR) device, a plurality of traffic layers may include at least coarse grain (CG) layer traffic and a fine grain (FG) layer traffic for a current VR scene update and scheduling the CG layer traffic of the current VR scene update in at least on resource unit (RU) of a plurality of RUs in a transmission opportunity (TXOP) for the VR device. When a first subset of RUs of the plurality of RUs remains available after scheduling the CG layer traffic the method includes scheduling FG layer traffic of a previous VR scene update in the first subset of RUs of the plurality of RUs, and when a second subset of RUs of the plurality of RUs remain available after scheduling the CG layer traffic and the FG layer traffic of a previous VR scene update, the method includes scheduling the FG layer traffic of the current VR scene update in at least one RU of the second subset of RUs. Other embodiments of this aspect include corresponding computer systems, apparatus, and computer programs recorded on one or more computer storage devices, each configured to perform the actions of the methods.

One example embodiment includes a system. The system includes one or more computer processors. The system also includes a memory containing a program which when executed by the one or more computer processors performs an operation. The operation may include: determining, at a virtual reality (VR) device, coarse grain (CG) layer traffic and fine grain (FG) layer traffic for a current VR scene update and scheduling the CG layer traffic of the current VR scene update in at least on resource unit (RU) of a plurality of RUs in a transmission opportunity (TXOP) for the VR device. When a first subset of RUs of the plurality of RUs remains available after scheduling the CG layer traffic the operation includes scheduling FG layer traffic of a previous VR scene update in the first subset of RUs of the plurality of RUs, and when a second subset of RUs of the plurality of RUs remain available after scheduling the CG layer traffic and the FG layer traffic of a previous VR scene update, the operation includes scheduling the FG layer traffic of the current VR scene update in at least one RU of the second subset of RUs.

In another embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions of a method. The method includes aggregating, at a controller in a virtual reality (VR) enabled network, resource unit (RU) utilization measurements for a plurality of VR scenes executing at one or more clients in the VR enabled network and determining from the RU utilization measurements, a RU utilization is above a safety threshold for an access point (AP) in the VR enabled network. When the RU utilization is above the safety threshold for the AP the method includes, inspecting the RU measurements to determine a coarse grain (CG) layer associated with a largest RU utilization at the AP in the VR enabled network, where the CG layer is associated with an associated client and a subscribed VR scene, and transmitting a scene throttle message to the associated client to cause the associated client to reduce a size of the CG layer for the subscribed VR scene. Other embodiments of this aspect include corresponding computer systems, apparatus, and computer programs recorded on one or more computer storage devices, each configured to perform the actions of the methods.

Example Embodiments

In a VR/AR systems, client devices provide a VR/AR experience to users via various user interaction interfaces. The client devices subscribe to VR/AR scenes from a VR/AR server which provides a base scene model to one or more client devices executing the VR/AR scene. In some examples, the VR/AR scenes may include one or more subscenes of the scene, where the subscenes include VR/AR components for a duration of the VR/AR scene. In some examples, subscene rendering depends on a base X3D standard model which represents VR/AR data using polygon count, size [resolution], textures, color depth, etc. Subscene components may be received from both the subscribed VR/AR server and from updates produced by other client devices when interacting with the X3D model.

With the increase of wireless VR/AR client devices, wireless networks are frequently a crucial component of VR/AR systems for delivering scene and subscene updates to client devices in a VR/AR system. Some methods, allow for an orthogonal frequency division multiple access (OFDMA) scheduler on access points (APs) in wireless networks to schedule parallel subscene information into a same wireless transmission opportunity (TXOP) at an AP. This OFDMA scheduling improves an overall synchronicity of the VR/AR system. However, under high-scale conditions such as a growing number of VR/AR client devices, increasing precision of scene updates, growing number of scene subscriptions, etc., it may not be possible to schedule the necessary scene update data in resource units (RUs) within the same TXOP. When this occurs, some of the scene updates will be scheduled in a next available RU in later TXOPs. This condition may reduce the synchronicity of the affected scenes; and thus, that of the whole VR/AR system. For example, a user of a client device may experience lag or noticeable delays of synchronicity in the VR/AR scene displayed to the user.

The systems and methods described herein implement an advantageous data layering method which provides a distinction between coarse grain and fine grain data in a scene or subscene update in order to improve synchronicity and data handling in VR/AR systems. For example, when a user interacts with VR/AR objects via a client device, the client device sends a subscene update representing that interaction to other clients and the VR/AR server. For example, a user may move a VR/AR object in a rendered VR/AR scene from point A to point B within the scene. The object movement from point A to point B needs to be represented on all VR/AR client devices watching the action (e.g., subscribed to the scene/subscene). The scene updates generated by the object movement may be more or less precise as long as the movement is represented in the update. For example, the object movement may be represented by a minimum amount of data which represents the movement of the object, but without great detail.

For example, the object movement/scene update may depend on how many points are used to represent a trajectory of the movement, how many decimals on the data, how many polygons are represented during the movement in an X3D model update, etc. The amount of data that represents an object movement or otherwise a scene update can be dynamically configured. For example, the client device, using the X3D model, configures a DELTA (in time, or in space) between consecutive points, in order to describe the movement's trajectory, resulting in more or less points. A large DELTA (DELTA coarse) describes the trajectory roughly, and a small DELTA (DELTA fine) improves the precision of the rough trajectory. In some examples, the client device configures the floating-point precision of Euclidean coordinates (whether absolute or relative) of the movement's trajectory points. Thus, the client device may utilize a limited number of decimals (rough, coarse), which can be fine-tuned by adding a higher precision term (fine).

As described herein, the VR/AR systems and methods provide for allocating the scene updates between components in the VR/AR system in two layers: the coarse grain (CG) layer and the fine grain (FG) layer. The utilization of the CG layer and FG layers allows for improved synchronicity and bandwidth utilization as described in relation to FIGS. 1-8.

FIG. 1 illustrates a network environment 100 for virtual reality and augmented reality scenes, according to embodiments described herein. In general, the network environment 100 provides for VR/AR scenes to end users via a wireless network, WLAN 101, and VR/AR client devices 130a-130c. The network environment 100 also includes a VR/AR server 115 which generates and/or renders VR/AR scenes in one or more VR/AR sessions. The VR/AR server 115 sends the generated scenes/sessions to the VR/AR client devices 130a-130c via the network environment 100. In some examples, the VR/AR server provides a same VR/AR experience to each of the VR/AR client devices 130a-130c where the client devices are executing portions or copies of a same VR/AR sessions/scene or subscene (e.g., a same game or other simulation). In some examples, the VR/AR server renders different VR/AR sessions/scenes for each of the VR/AR client devices 130a-130c based on the individual client requests. For example, each client may be executing a different VR/AR scene.

In some examples, in order to provide the generated VR/AR scenes from the VR/AR server to the VR/AR client devices 130a-130c, the network environment 100 also includes include a software defined network (SDN) controller, such as SDN controller 105, a wireless local area network controller (WLC), such as controller 110, and one or more access points (AP) such as AP 120 and AP 125. The controller 110 and the APs 120 and 125 provide a wireless area network (WLAN) such as WLAN 101 to connect the VR/AR client devices 130a-130c to the wider network environment 100. These components enable the efficient delivery and rendering of VR/AR scenes at the VR/AR clients in the network environment 100. In some examples, these different systems or components, along with the VR/AR server 115, may be embodied as hardware, software, or a combination of hardware and software as further described herein.

In some examples, the VR/AR client devices 130a-130c may include one or more Wi-Fi 6 devices, Wi-Fi 7 devices, future defined types of wireless client devices, and/or Wi-Fi wireless client devices. The VR/AR client devices 130a-130c may also include wireless devices which include a cellular telephone, a smart telephone, a handheld wireless device, wireless glasses, a wireless watch, a wireless personal device, a tablet, a head mounted device (HMD) or another device that may be communicating using Wi-Fi or other wireless communication protocol. In some examples, the APs 120 and 125 provide and control wireless network access for the VR/AR client devices 130a-130c.

The WLAN 101 may include a Basic Service Set or and/or an Extended Service Set (ESS) including the controller 110, APs 120 and 125, and VR/AR client devices 130a-130c. The VR/AR client device 130a-130c may associate and/or communicate with the APs 120 and 125 to join the WLAN 101. Joining the WLAN enables the client devices 130a-130c to wirelessly communicate with each other via APs 120 and 125, with each other directly, with the APs 120 and 125, or to another network or resource through the APs 120 and 125.

Each of the components in the network environment 100 include one or more modules to accomplish perform the functions and methods described herein. For example, the VR/AR server 115 includes a subscene streaming module 116 which generates/renders scene sessions for connected clients in the network environment 100. In some examples, the VR/AR server transmits the generated scene sessions to the controller 110 via VR scenes 150. In some examples, the VR/AR server 115 also receives updates from the connected clients in the network environment 100 via VR actions 151. The subscene streaming module 116 may utilize the VR actions 151 to alter and/or update the sessions/scenes/subscenes provided to the client devices in the network environment 100.

The controller distributes the VR scenes 150 to subscribed clients in the WLAN 101 such as the VR/AR client devices 130a-130c. In some examples, the controller 110 is connected to the APs 120 and 125 via CAPWAP tunnel 160 and CAPWAP tunnel 161. The APs in turn provide VR traffic 170a-170c to the VR/AR client devices 130a-130c. In some examples, the controller 110 includes various wireless control modules for managing control and traffic for the network 101 as well as an RU aggregator module 111 which aggregates RU utilization information for VR/AR traffic for the connected APs in the WLAN 101 such as the APs 120 and 125.

The APs 120 and 125 include OFDMA scheduling modules 122 and 127 which provide OFDMA scheduling as well as RU utilization monitors 121 and 126 which provide for monitoring of RU utilization of the VR/AR traffic at the APs. The VR/AR client devices 130a-130c include subscene rendering modules 131a, 131b, and 131c and subscene update modules 132a, 132b, and 132c which provide the scene and subscene information to users as well as receive updates from users interacting with the VR/AR scenes. In some examples, the VR/AR client devices 130a-130c provide scene updates from the modules 132a-132c to the other clients via connections 172 and 173 (where the connections pass through the APs 120 and 125) as well as to the VR/AR server 115 via the WLAN 101.

In some examples, the SDN controller 105 provides control and management of the network environment 100 via modules 106 and 107. For example, the control connections 180 and 181 provide scene allocation information and congestion control information to the VR/AR client devices 130a-130c as described herein. For example, when a client, such as the VR/AR client device 130a starts interacting with a scene, the VR/AR client device 130a sends REQUEST_SCENE_CHANNEL (scene_id) to the SDN controller 105 via the control connection 181. The SDN controller 105 replies with a GRANT_SCENE_CHANNEL message which includes a scene identification (ID), a CG layer ID and FG layer. While the SDN controller 105 is described herein as a separate entity, in some examples, the SDN controller 105 is collocated with the controller 110 such that the controller 110 performs the functions of the SDN controller. In some examples, the VR/AR server 115 may also directly interface with the SDN controller 105 and the VR/AR clients 130a-130c via the connections 185 and 186 where the VR/AR scene control is received from the client via connection 186 and the interface with the SDN controller 105 via the connection 185.

In some examples, unique IDs for the CG layer ID and the FG layer ID are allocated by the SDN controller 105 for the scene and client. Support for such classification can be realized through simple client driver adaptation, or SDN scene classification. In turn, the VR/AR client device 130a ships the IDs in all packets conveying updates to the scene. These IDs provide APs, such as the AP 120 with visibility into the data volume produced by every client for every scene for every layer. In some examples, the CG layer ID and the FG layer ID may be shipped in a number of ways, for instance, the "flow label" field in an IPV6 header, or some field in the VR/AR payload easily retrievable via deep packet inspection (DPI). In some examples, the SDN controller 105 may also assign different quality of service (QoS) tags to FG and CG layers for the VR/AR client device 130a in order to provide insight into the CG and FG layers. The VR/AR client device 130a then schedules various data in the CG and FG layers as described in relation to FIGS. 2A-2B.

FIG. 2A illustrates a TXOP 220 with a coarse grain layer and a fine grain layer, according to embodiments described herein. In some examples, upon a scene update generated by the module 132a at a given time, the VR/AR client device 130a will schedule data for a CG layer of the subscene update in RUs of current TXOP. For example, the TXOP 220 includes RUs 201-210. In some examples, the VR/AR client device 130a uses a default level CG layer parameter to generate data for the CG layers and the FG layers. The client device then begins scheduling the CG layer data in RUs. For example, the CG layer 221 is scheduled in the RUs 201-205. When RUs are left in the TXOP 220, the VR/AR client device 130a schedules FG layer data 222. In some examples, the FG layer data 222 includes data left from earlier scene updates. For example, the RUs 206-207 may include FG layer data from an earlier scene update. When RUs remain in the TXOP 220, FG layer data from current scene update will be scheduled such as in the RUs 208-209.

In some examples, the SDN controller 105 may provide congestion control messages to the VR/AR client device 130a in order to decrease congestion in the network environment 100. However, in the absence of a congestion control message, the VR/AR client device 130a may increase an amount of data in the CG layer 231 as shown in FIG. 2B which illustrates a TXOP 230 with an increased coarse grain layer and a fine grain layer, according to embodiments described herein. For example, when the client 130a has not received a throttle message for a scene in a configured time period P, the client performs a small increment in the granularity of its CG layer 231, such that more data will go into the CG layer. In some examples, this is repeated every time period P. In some examples, P is a time equivalent to a time for the whole system VR/AR system to reach equilibrium (i.e., every client device is consistently getting a fair share of CG traffic across). In some examples, the P time period is approximately between 0.1 to 10 seconds based on the network environment conditions and configurations. As shown in the TXOP 230, the larger CG layer 231 utilizes more RUs, such as RUs 201-206, where the remaining RUs include FG layer 232 data in RUs 207-210. In some examples, where large amounts of network resources are available, the CG layer may be increased such that the entire scene update (including fine detail) is included in the CG layer. In other examples, a congestion control or throttle message may be sent to the VR/AR client device 130a when network resources are more limited.

Figure 2C:
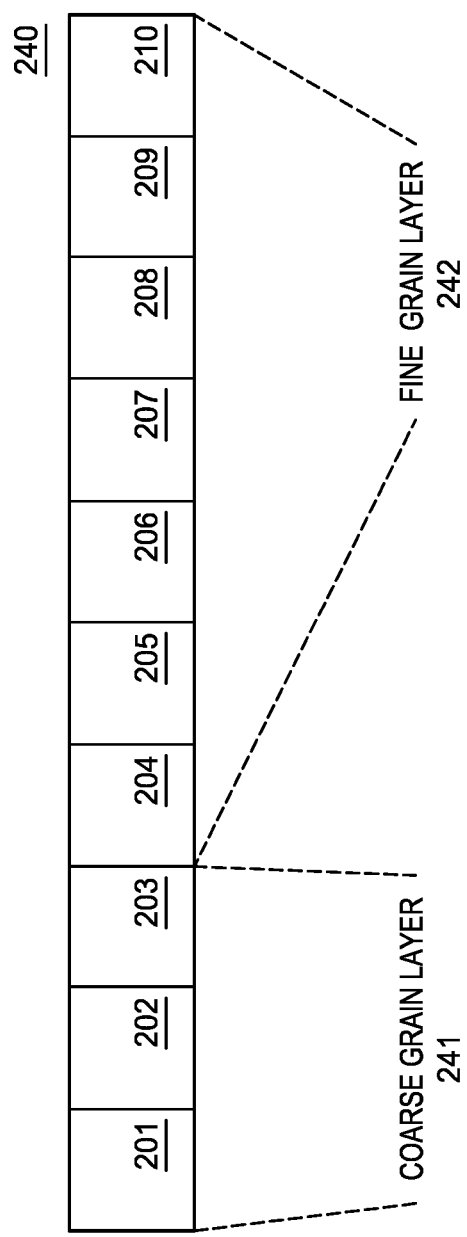
FIG. 2C illustrates a scene update with a throttled coarse grain layer, according to embodiments described herein.

FIG. 2C illustrates a TXOP 240 with a throttled coarse grain layer and a fine grain layer, according to embodiments described herein. The VR/AR client device 130a, upon reception of throttle or congestion control message from the SDN controller 105, reconfigures its granularity in order decrease the data that goes into the CG layer 241 (e.g., divide the data by 2), which in turn increases the data going to the FG layer 242 for future updates of that scene. For example, as shown in the TXOP, the CG layer occupies fewer RUs such as RUs 201-203 and schedules the FG layer data in the RUs 204-210. In some examples, the various CG and FG layer data is monitored and adjusted according to utilization at the network components such as the APs 120 and 125 as described in relation to FIGS. 3A-3B.

FIGS. 3A-B illustrate transmission opportunities at an access point, according to embodiments described herein. In some examples, as the clients mark their CG and FG traffic (as per X3D labels), The APs (e.g., APs 120 and 125) and WLCs (e.g., controller 110) gather and aggregate how many RUs each client and each scene are taking for each TXOP and report the utilization information to the SDN controller via utilization information 152. In some examples, M[AP] denotes the total RUs available in a TXOP for VR/AR traffic in an AP and or WLC. This is set by a configuration provided by the SDN controller 105. In some examples, safety_threshold(M[AP]), such as safety threshold 320 in TXOPs 330 and 340, denotes a fraction of M[AP] (e.g., 60%) considered safe against sudden increases of CG data volume which may be caused by increased clients, increased complexity in scene updates etc. The TXOPs 330 and 340 include RUs 301-310.

In the TXOP 330, the CG layer 331 data from various clients is scheduled in the RUs 301-304 which is below the safety threshold 320 and the FG layer data 332 is scheduled in the RUs 307-310. In the TXOP 340, the RUs 301-307 are scheduled for CG layer 341 data, which is above the safety threshold 320, where the FG layer data 342 is scheduled in the RUs 308-310. When the SDN controller 105 detects that RUs used by all CG layers in an AP's TXOP is greater than safety_threshold(M[AP]), the SDN controller selects a client and scene from a ranked list of APs [client, scene, AP] (i.e., the client using most resources), and sends asynchronous message SCENE_THROTTLE(scene_id) to the client.

For example, as shown in FIG. 4, the ranked list 400 includes a rank of the client devices 130a-130b connected to the AP 120 and associated scenes and RU utilization. In this example, a top utilizer 410 is the VR/AR client device 130a executing scene_1. In this example, the SDN controller 105 sends the SCENE_THROTTLE(scene_1) to the VR/AR client device 130a, which in turn decreases the amount of data in the CG layer as shown in FIG. 2C and described herein in relation to FIGS. 5-8.

Figure 5:
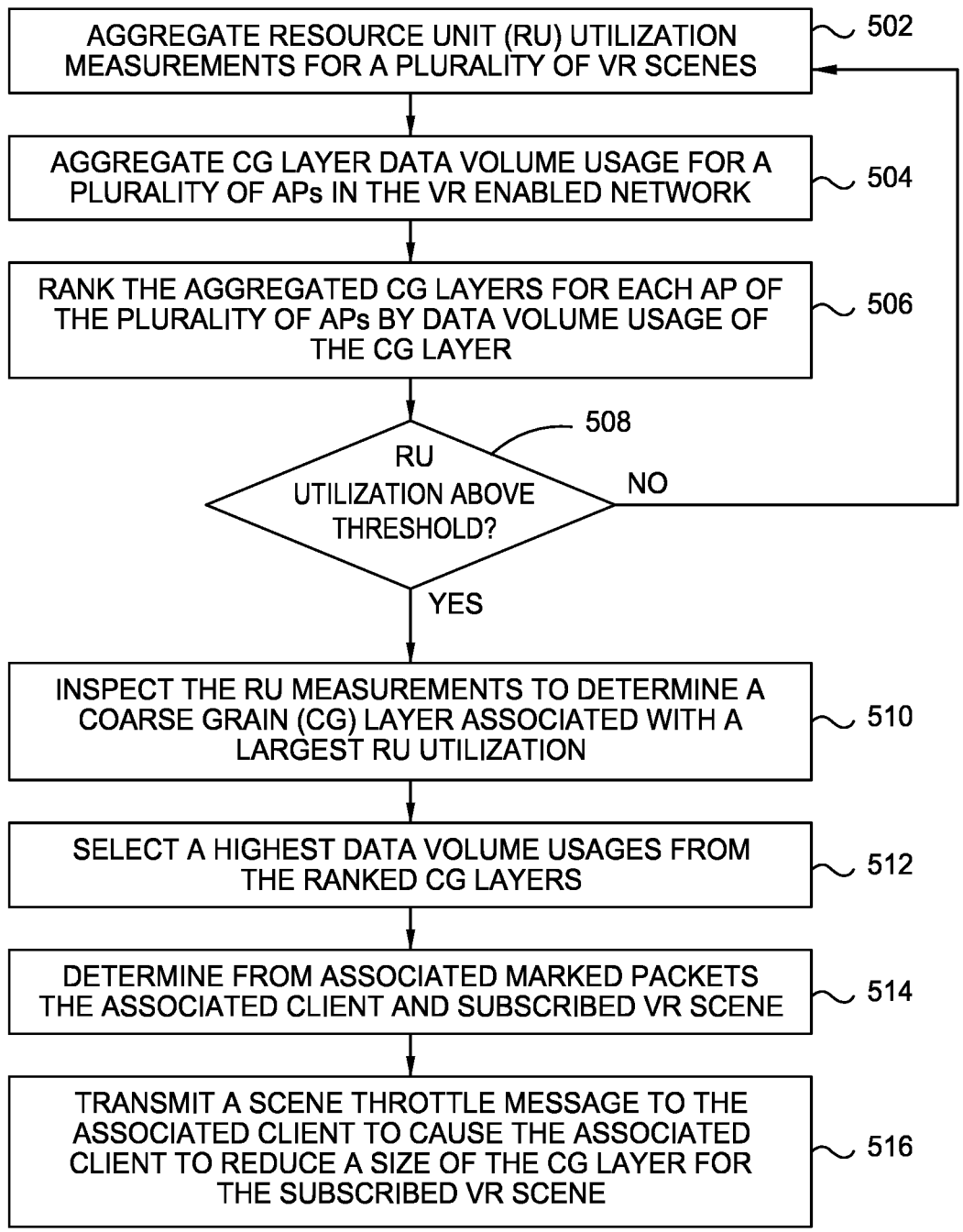
FIG. 5 illustrates a method for coarse grain layer and a fine grain layer control at a controller, according to embodiments described herein.

FIG. 5 illustrates a method 500 for coarse grain layer and a fine grain layer control at a controller, according to embodiments described herein. Method 500 begins at block 502 where the SDN controller 105 aggregates RU utilization measurements for a plurality of VR scenes executing at one or more clients in the VR enabled network. In some examples, the SDN controller 105 receives RU utilization measurements from the APs 120 and 125 as well as the controller 110, where the utilization measurements include a VR scene ID, a CG scene ID indicating a data volume of a CG layer associated with the VR scene, and an FG scene ID located in marked packets in a VR scene update received from the one or more clients in the VR enabled network.

At block 504, the SDN controller 105 aggregates CG layer data volume usage for a plurality of APs in the VR enabled network. In some examples, the SDN controller 105 aggregates CG layer data volume usages per each TXOP for a plurality of APs in the VR enabled network. In some examples, the CG layer data volume usage is based on the CG scene ID in the marked packets and/or the QoS tags for the marked packets.

At block 506, the SDN controller 105 ranks the aggregated CG layers for each AP of the plurality of APs by data volume usage of the CG layer. For example, as shown in FIG. 4, the SDN controller 105 generates the ranked list 400, which includes a rank of the client devices 130a-130b connected to the AP 120 and associated scenes and RU utilization.

At block 508, the SDN controller 105 determines from the RU utilization measurements, whether an RU utilization is above a safety threshold for an AP in the VR enabled network. For example, as shown in the FIGS. 3A and 3B, the CG layer data may be above or below the safety threshold 320. When the RU utilization is below the safety threshold for the AP as shown in FIG. 3A, method 500 proceeds back to block 502, where the SDN controller 105 continues to monitor traffic utilization in the APs.

When the RU utilization is above the safety threshold for the AP, as shown in FIG. 3B, method 500 proceeds to block 510 where the SDN controller 105 inspects the RU measurements to determine a CG layer associated with a largest RU utilization at the AP in the VR enabled network, where the CG layer is associated with an associated client and a subscribed VR scene. For example, the SDN controller inspects the ranked list 400 and at block 512, the SDN controller 105 selects a highest data volume usage from the ranked CG layers. At block 514 the SDN controller 105 determines from associated marked packets the associated client and subscribed VR scene. For example, the SDN controller 105 determines the VR/AR client device 130a and scene_1 from the ranked list 400 as the highest data user.

At block 516, the SDN controller 105 transmits a scene throttle message to the associated client to cause the associated client to reduce a size of the CG layer for the subscribed VR scene. For example, the SDN controller 105 sends the SCENE_THROTTLE(scene_1) to the VR/AR client device 130a, which in turn decreases the amount of data in the CG layer as shown in FIG. 2C.

Figure 6:
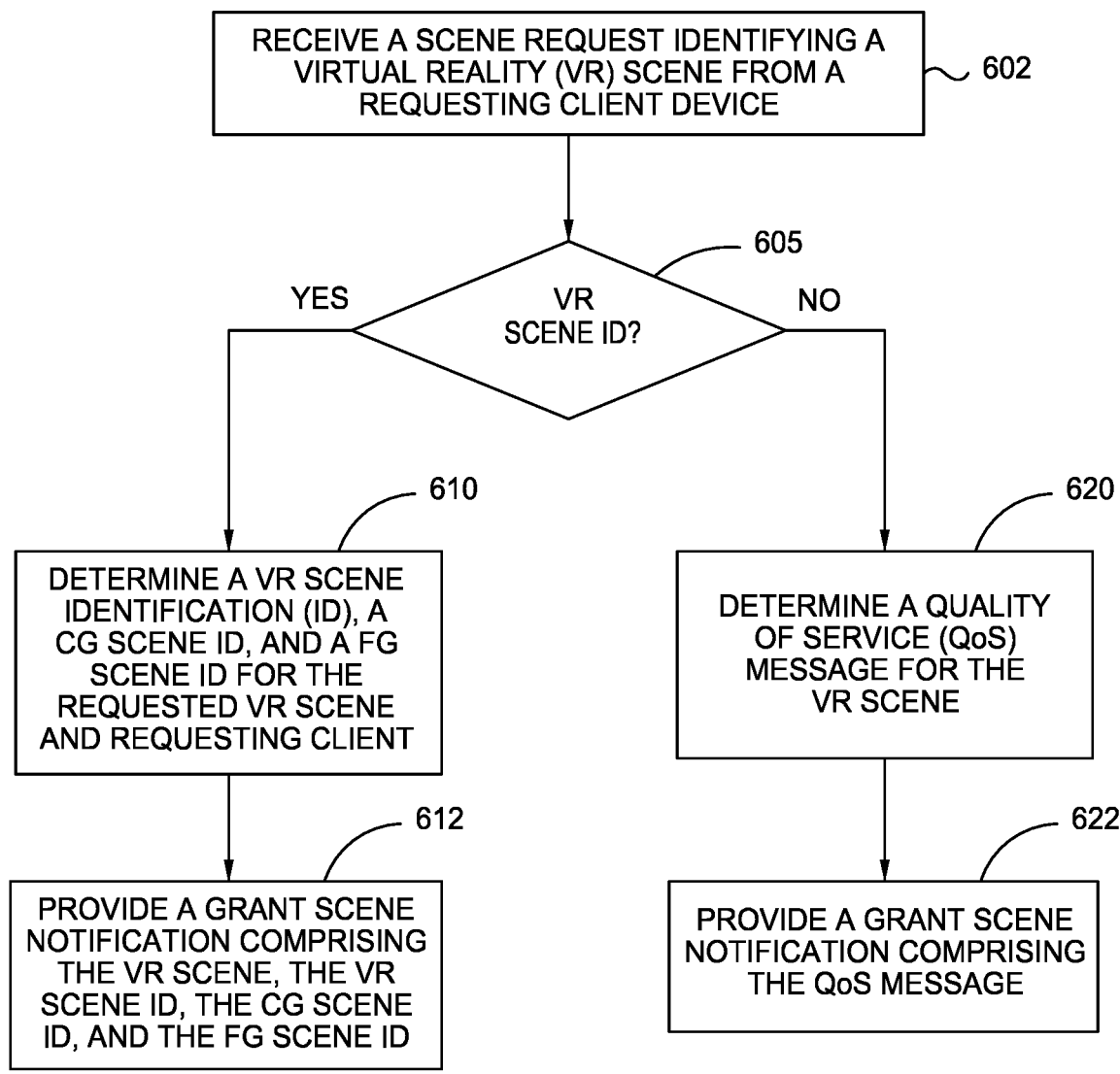
FIG. 6 illustrates a method for scene subscription at a controller, according to embodiments described herein.

FIG. 6 illustrates a method 600 for scene subscription at a controller, according to embodiments described herein. Method 600 begins at block 602 where the SDN controller 105 receives a scene request identifying a VR scene from a requesting client device. For example, the SDN controller 105 receives a scene request from the VR/AR client device 130a via the control connection 181 shown in FIG. 1. While described herein as a separate entities or network function, the SDN controller 105 may be collocated with other functions in the network such as collocated with the controller 110, etc.

At block 605, the SDN controller 105 determines whether the network environment 100 supports VR scene IDs. When the network environment 100 supports scene IDs, method 600 proceeds to block 610 where the SDN controller 105 determines a VR scene ID, a CG scene ID, and a FG scene ID for the requested VR scene and requesting client (e.g., scene_1 for the VR/AR client device 130a). At block 612, the SDN controller 105 provides a grant scene notification which includes the VR scene, the VR scene ID, the CG scene ID, and the FG scene ID to the VR/AR client device 130a.

When the network environment 100 supports QoS tags, method 600 proceeds to block 620 where the SDN controller 105 determines a QoS message for the VR scene where the QoS message includes a CG scene QoS tag and a FG scene QoS tag. At block 622 the SDN controller 105 provides a grant scene notification with the QoS message to the VR/AR client device 130a. For both grant scene notifications, the VR/AR client is provided access to the VR/AR server 115 for the subscribed scene and updates from other clients in the network environment 100.

Figure 7:
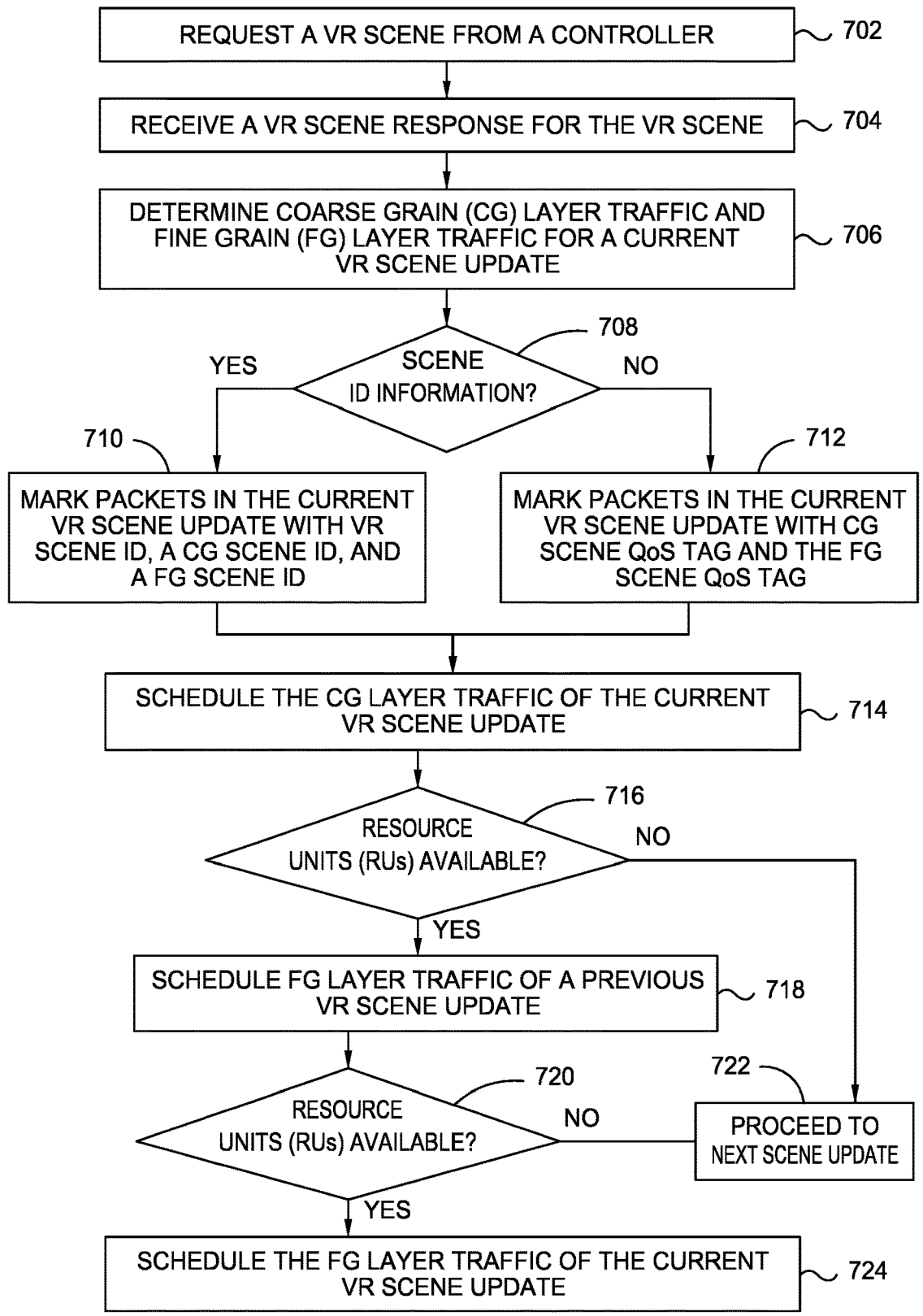
FIGS. 7-8 illustrate a methods for coarse grain layer and a fine grain layer control at a VR/AR device, according to embodiments described herein.

FIG. 7 illustrates a method 700 for coarse grain layer and a fine grain layer control at a VR/AR device. Method 700 begins at block 702 where the VR/AR client device 130a requests a VR scene from a controller. For example, the VR/AR client device 130a sends a REQUEST_SCENE_CHANNEL (scene_id) to the SDN controller 105 via the control connection 181.

At block 704, the VR/AR client device 130a receives a VR scene response for the VR scene. For example, the SDN controller 105 replies with a GRANT_SCENE_CHANNEL message which includes a scene identification (ID), a CG layer ID and FG layer or QoS tags as described in relation to FIG. 6.

In some examples, unique IDs for the CG layer ID and the FG layer ID are allocated by the SDN controller 105 for the scene and client. In some examples, the SDN controller 105 may also assign different quality of service (QoS) tags to FG and CG layers for the VR/AR client device 130a in order to provide insight into the CG and FG layers. The VR/AR client device 130a then schedules various data in the CG and FG layers as described in relation to FIGS. 2A-2B.

At block 706, the VR/AR client device 130a determines CG layer traffic and FG layer traffic for a current VR scene update. For example, the VR/AR client uses the X3D model to determine an amount of data to represent a subscene/scene update for a scene at the VR/AR client device 130a, as described in more detail in relation to FIG. 8.

In some examples, at block 708 the VR/AR client device 130a determines whether the VR scene response contains scene ID information such as a CG ID and FG ID. When the client has been assigned CG ID and FG ID, method 700 proceeds to block 708, where the VR/AR client device 130a marks packets in the current VR scene update with the VR scene ID, the CG scene ID, and the FG scene ID. In another example, at block 710 the VR/AR client device 130a marks packets in the current VR scene update with CG scene QoS tag and the FG scene QoS tag received from the controller.

At block 712, the VR/AR client device 130a schedules the CG layer traffic of the current VR scene update in at least one RU of a plurality of RUs in a TXOP for the VR device. For example, as shown in FIG. 2A, the client device schedules CG layer in the RUs 201-205.

At block 714, the VR/AR client device 130a determines whether a first subset of RUs of the plurality of RUs remains available after scheduling the CG layer traffic at block 712. For example, as shown in FIG. 2A, the client device determines that the RUs 206-210 are still available.

When a first subset of RUs of the plurality of RUs remains available after scheduling the CG layer traffic, the method 700 proceeds to block 716, where the VR/AR client device 130a schedules FG layer traffic of a previous VR scene update in the first subset of RUs of the plurality of RUs. For example, FG layer traffic from a previous subscene update is scheduled in the RUs 206-207 in FIG. 2A.

At block 718, the VR/AR client device 130a determines whether a second subset of RUs of the plurality of RUs remain available after scheduling the at least CG layer traffic and the FG layer traffic of a previous VR scene update. At block 720, when the second subset of RUs of the plurality of RUs remains available after scheduling the CG layer traffic, the method 700 proceeds to block 724, where the VR/AR client device 130a schedules FG layer traffic of a current VR scene update in the second subset of RUs of the plurality of RUs. For example, FG layer traffic from the current subscene update is scheduled in the RUs 208-209 in FIG. 2A. At block 720, when the RUs for a TXOP at the client device are utilized, the client device stores any remaining FG layer data for a next TXOP and proceeds to a next scene update at block 722.

Figure 8:
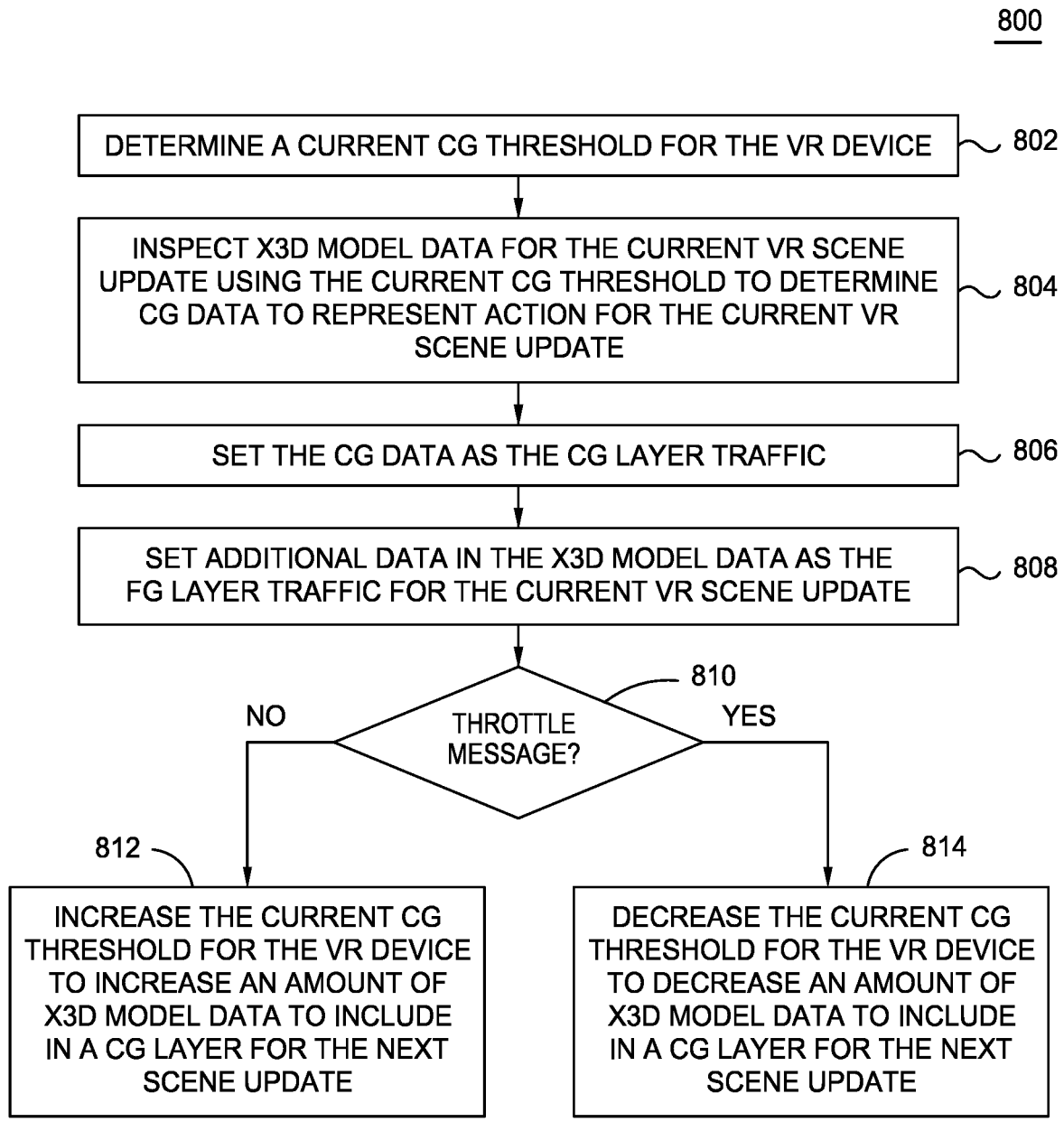

FIG. 8 illustrates a method 800 for coarse grain layer and a fine grain layer control at a VR/AR device, according to embodiments described herein. Method 800 begins at block 802 where the VR/AR client device 130a determining a current CG parameter for the VR device. In some examples, the CG parameter may include a default setting for the coarse layer data. For example, 10% of the data for a VR scene may be classified as CG which may then be adjusted to approach an equilibrium as the CG and FG layers are processed and utilized in network traffic communications. In some examples, the CG parameters may also include a parameter received from the SDN controller (which reflects the current traffic status in the network) in the GRANT_SCENE_CHANNEL message At block 804 the VR/AR client device 130a inspects X3D model data (or other VR/AR or graphical model data) for the current VR scene update using the current CG threshold to determine CG data to represent action for in the current VR scene update. For example, a scene update may include a representation of when a participant/user in the VR/AR scene moves an object, such as moving his or her hand. For example, the participant's hand moves from space coordinates (120, 120) to (240, 240) (where the coordinates are assigned by the VR/AR system). In some examples, the trajectory of the movement is not straight (e.g., it is an irregular curve), and the sequence of points describing the movement include:

(120, 120)
(145, 143)
(170,165)
(182, 179)
(204, 198)
(215,205)
(225,220)
(232, 228)
(240, 240)

In some examples, the VR/AR device determines that only three of the points describing the movement are needed and/or fit within the CG layer traffic, such that the CG layer includes just (120, 120), (204, 198), and (240, 240). The remaining points describing the (fine-grain) trajectory will thus be shipped in FG traffic.

At block 806 the VR/AR client device 130*a* sets the CG data as the CG layer traffic; and sets additional data in the X3D model data as the FG layer traffic for the current VR scene update at block 808.

At block 810, the VR/AR client device 130*a* determines whether the device has received a throttle message from the SDN controller 105. When a throttle message has not been received method 800 proceeds to block 812, where the VR/AR client device 130*a* increases the current CG parameter for the VR/AR device to increase an amount of X3D model data to include in a CG layer for the next scene update.

When a throttle message has been received method 800 proceeds to block 814, where the VR/AR client device 130*a* decreases the current CG parameter for the VR device to decrease an amount of X3D model data to include in a CG layer for the next scene update.

Figure 9:
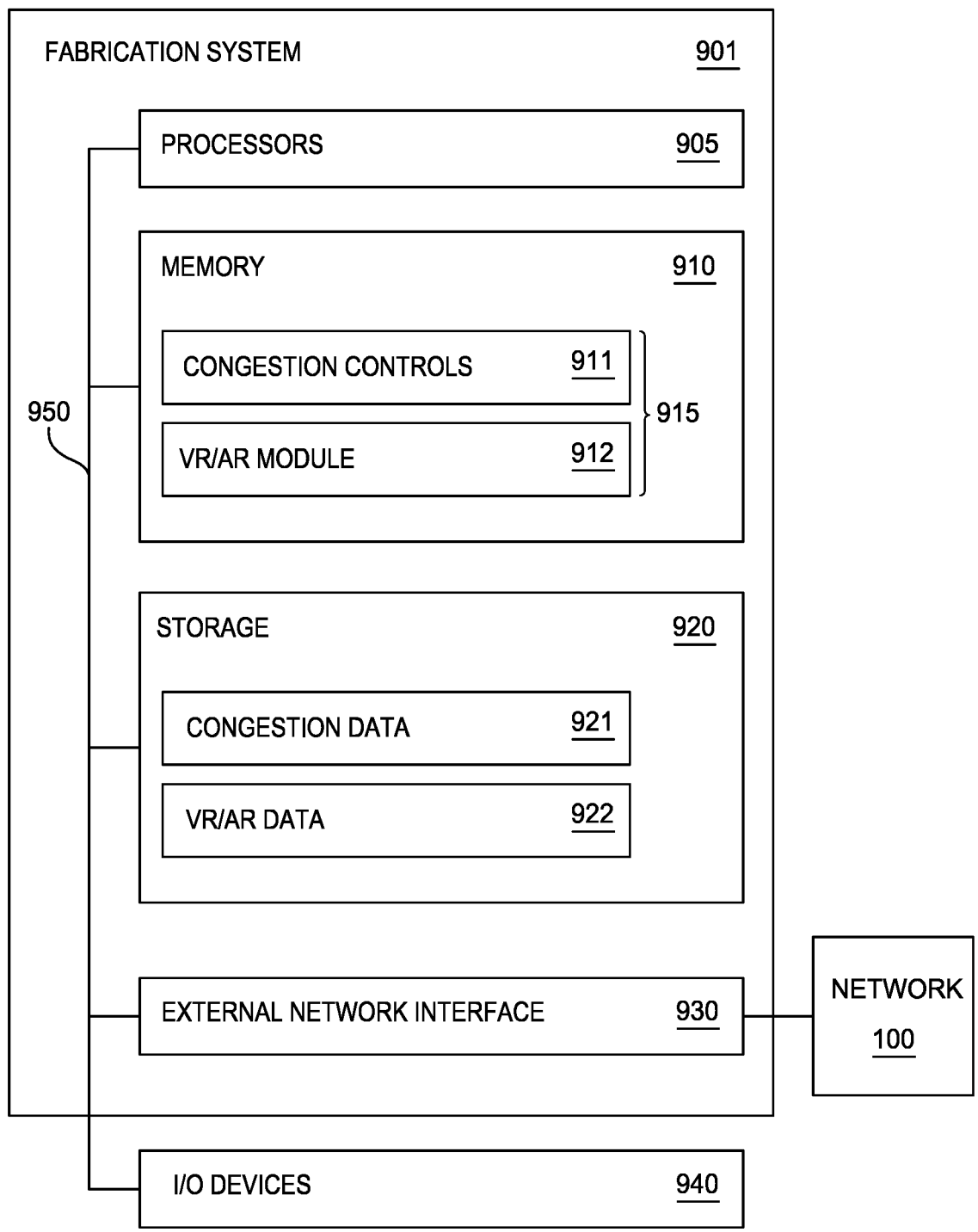
FIG. 9 is a block diagram of a network device, according to one embodiment.

FIG. 9 is a block diagram of a network device 901, such as either any of the VR/AR client devices 130*a*-130*c*, SDN controller 105 etc. . . . . In some examples, the network device 901 is in the arrangement 900 including the network 100. The network device 901 may serve as any of the devices described herein. The network device 901 is shown in the form of a general-purpose computing device, but may include a server and/or application executing on a cloud network. The network device 901 may include, but is not limited to, one or more processing units or processors 905, a memory 910, a storage system 920, a network interface 930 connecting the network device 901 to the network environment 100, and a bus 950 that couples various system components including the memory 910 and storage system 920 to processors 905 and I/O devices 940.

Bus 950 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The network device 901 typically includes a variety of computer system readable media. Such media may be any available media that is accessible by the network device 901, and it includes both volatile and non-volatile media, removable and non-removable media.

Memory 910 can include computer system readable media in the form of volatile memory, such as random access memory (RAM) and/or cache memory. The network device 901 may further include other removable/non-removable, volatile/non-volatile computer system storage media. By way of example, storage system 920 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 950 by one or more data media interfaces. As will be further depicted and described below, memory 910 may include at least one program product having a set (e.g., at least one) of program modules that are configured to carry out the functions of various embodiments described herein.

The network device 901 may further include other removable/non-removable, volatile/non-volatile computer system storage media. In some examples, the storage system 920 may be included as part of memory 910 and may typically provide a non-volatile memory for the networked computing devices, and may include one or more different storage elements such as Flash memory, a hard disk drive, a solid state drive, an optical storage device, and/or a magnetic storage device. For example, storage system 920 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 950 by one or more data media interfaces. Storage system 920 may include media for congestion data 921 and VR/AR data 922, and other information stored for access and use by the network device 901.

Memory 910 may include a plurality of modules 915, including congestion control module 911 and VR/AR module 912 for performing various functions described herein in relation to FIGS. 1-8. The modules 915 generally include program code that is executable by one or more of the processors 905.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   determining, at a virtual reality (VR) device, a plurality of traffic layers comprising at least coarse grain (CG) layer traffic and fine grain (FG) layer traffic for a current VR scene update, wherein an amount of CG data to include in the CG layer traffic is determined at least in part by a CG threshold for the VR device, and wherein the current VR scene update comprises movement of a virtual object;
   scheduling the CG layer traffic of the current VR scene update in at least one resource unit (RU) of a plurality of RUs in a transmission opportunity (TXOP) for the VR device;
   when a first subset of RUs of the plurality of RUs remains available after scheduling the CG layer traffic:
      scheduling FG layer traffic of a previous VR scene update in the first subset of RUs of the plurality of RUs; and
   when a second subset of RUs of the plurality of RUs remain available after scheduling the CG layer traffic and the FG layer traffic of a previous VR scene update:
      scheduling the FG layer traffic of the current VR scene update in at least one RU of the second subset of RUs;
   receiving a throttle message from a controller; and at a next VR scene update, decreasing the current CG threshold for the VR device to decrease an amount of CG data to include in CG layer traffic for the next VR scene update.

2. The method of claim 1, wherein determining the CG layer traffic and the FG layer traffic further comprises:
   inspecting graphical model data for the current VR scene update using the current CG threshold to determine CG data to represent action for the current VR scene update;
   setting the CG data as the CG layer traffic; and
   setting additional data in the graphical model data as the FG layer traffic for the current VR scene update.

3. The method of claim 2, further comprising:
   at a second next VR scene update, increasing the current CG threshold for the VR device to increase an amount of graphical model data to include in a CG layer for the next VR scene update.

4. The method of claim 1, further comprising:
   requesting a VR scene from a controller;
   receiving a VR scene response for the VR scene, wherein the VR scene response comprises:
      a VR scene identification (ID),
      a CG scene ID, and
      a FG scene ID; and
   marking packets in the current VR scene update with the VR scene ID, the CG scene ID, and the FG scene ID.

5. The method of claim 1, further comprising:
receiving a quality of service (QoS) message for the VR scene from a controller, wherein the QoS message comprises:
a CG scene QoS tag, and
a FG scene QoS tag; and
marking packets in the current VR scene update with CG scene QoS tag and the FG scene QoS tag.

6. The method of claim 1, wherein the VR device comprises one of:
a VR client device subscribed to a VR scene; and
an access point in a VR network enabled network providing scene updates to a VR client device.

7. A system comprising:
one or more computer processors; and a memory containing a program which when executed by the one or more computer processors performs an operation comprising:
determining, at a virtual reality (VR) device, coarse grain (CG) layer traffic and fine grain (FG) layer traffic for a current VR scene update, wherein an amount of CG data to include in the CG layer traffic is determined at least in part by a CG threshold for the VR device, and wherein the current VR scene update comprises movement of a virtual object;
scheduling the CG layer traffic of the current VR scene update in at least one resource unit (RU) of a plurality of RUs in a transmission opportunity (TXOP) for the VR device;
when a first subset of RUs of the plurality of RUs remains available after scheduling the CG layer traffic:
scheduling FG layer traffic of a previous VR scene update in the first subset of RUs of the plurality of RUs; and
when a second subset of RUs of the plurality of RUs remain available after scheduling the CG layer traffic and the FG layer traffic of a previous VR scene update:
scheduling the FG layer traffic of the current VR scene update in at least one RU of the second subset of RUs;
receiving a throttle message from a controller; and at a next VR scene update, decreasing the current CG threshold for the VR device to decrease an amount of CG data to include in CG layer traffic for the next VR scene update.

8. The system of claim 7, wherein determining the CG layer traffic and the FG layer traffic further comprises:
inspecting X3D model data for the current VR scene update using the current CG threshold to determine CG data to represent action for the current VR scene update;
setting the CG data as the CG layer traffic; and
setting additional data in the X3D model data as the FG layer traffic for the current VR scene update.

9. The system of claim 8, further comprising:
at a second next VR scene update, increasing the current CG threshold for the VR device to increase an amount of X3D model data to include in a CG layer for the next VR scene update.

10. The system of claim 7, further comprising:
requesting a VR scene from a controller;
receiving a VR scene response for the VR scene, wherein the VR scene response comprises:
a VR scene identification (ID),
a CG scene ID, and
a FG scene ID; and
marking packets in the current VR scene update with the VR scene ID, the CG scene ID, and the FG scene ID.

11. The system of claim 7, wherein the operation further comprises:
receiving a quality of service (QoS) message for the VR scene from a controller, wherein the QoS message comprises:
a CG scene QoS tag, and
a FG scene QoS tag; and
marking packets in the current VR scene update with CG scene QoS tag and the FG scene QoS tag.

12. The system of claim 7, wherein the VR device comprises one of:
a VR client device subscribed to a VR scene; and
an access point in a VR network enabled network providing scene updates to a VR client device.

* * * * *